(12) United States Patent
Hosseini et al.

(10) Patent No.: US 11,805,496 B2
(45) Date of Patent: Oct. 31, 2023

(54) SIDELINK RESOURCE INFORMATION SIGNALING FOR SIDELINK RESOURCE SELECTION

(71) Applicant: QUALCOMM Incorporated, San Diego, CA (US)

(72) Inventors: Seyedkianoush Hosseini, San Diego, CA (US); Tingfang Ji, San Diego, CA (US); Peter Gaal, San Diego, CA (US); Hwan Joon Kwon, San Diego, CA (US); Wei Yang, San Diego, CA (US); Yi Huang, San Diego, CA (US); Tugcan Aktas, La Jolla, CA (US); Wanshi Chen, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 3 days.

(21) Appl. No.: 17/444,361

(22) Filed: Aug. 3, 2021

(65) Prior Publication Data
US 2022/0046600 A1 Feb. 10, 2022

Related U.S. Application Data

(60) Provisional application No. 62/706,303, filed on Aug. 7, 2020.

(51) Int. Cl.
*H04W 72/02* (2009.01)
*H04B 17/318* (2015.01)
(Continued)

(52) U.S. Cl.
CPC .......... *H04W 72/02* (2013.01); *H04B 17/318* (2015.01); *H04L 1/0003* (2013.01);
(Continued)

(58) Field of Classification Search
CPC ..... H04W 72/02; H04W 24/10; H04W 92/18; H04B 17/318
See application file for complete search history.

(56) References Cited

U.S. PATENT DOCUMENTS

2017/0280460 A1* 9/2017 Emmanuel ............ H04L 5/0055
2018/0324010 A1* 11/2018 Gulati .................. H04L 1/0011
(Continued)

FOREIGN PATENT DOCUMENTS

WO    WO 2020/080914 A1 * 4/2020 ............ H04W 72/12

OTHER PUBLICATIONS

Huawei., et al., "On Sidelink Enhancement", 3GPP Draft, R1-2004602, 3GPP TSG RAN WG1 Meeting #101-e, 3rd Generation Partnership Project (3GPP), Mobile Competence Centre, 650, Route Des Lucioles, F-06921 Sophia-Antipolis Cedex, France, vol. RAN WG1. No. E-meeting, May 25, 2020-Jun. 5, 2020, May 16, 2020 (May 16, 2020), XP051886317, 3 Pages, Retrieved from the Internet: URL:https://ftp.3gpp.org/tsg_ran/WG1_RL1/TSGR1_101-e/Docs/R1-2004602.zip, R1-2004602.docx [retrieved on May 16, 2020], The whole document, Paragraph 1 Introduction, p. 1, Paragraph 3.2 Resource Allocation to Enhance Reliability and Reduce Latency, p. 2-p. 3.
(Continued)

*Primary Examiner* — Jamal Javaid
*Assistant Examiner* — Ryan C Kavleski
(74) *Attorney, Agent, or Firm* — Harrity & Harrity, LLP

(57) ABSTRACT

Various aspects of the present disclosure generally relate to wireless communication. In some aspects, a first user equipment (UE) may receive, via a sidelink interface, a message from a second UE. The UE may transmit, to the second UE, sidelink resource information for sidelink resources that are available to the second UE, wherein the sidelink resource information is based at least in part on a measured power
(Continued)

level associated with the message received from the second UE. Numerous other aspects are provided.

22 Claims, 10 Drawing Sheets

(51) Int. Cl.
*H04L 1/00* (2006.01)
*H04W 24/10* (2009.01)
*H04W 72/541* (2023.01)
*H04W 92/18* (2009.01)

(52) U.S. Cl.
CPC ......... *H04W 24/10* (2013.01); *H04W 72/541* (2023.01); *H04W 92/18* (2013.01)

(56) References Cited

U.S. PATENT DOCUMENTS

| | | | | |
|---|---|---|---|---|
| 2019/0356451 | A1* | 11/2019 | Zhang | H04W 72/23 |
| 2021/0160876 | A1* | 5/2021 | Osawa | H04W 72/0453 |
| 2021/0410084 | A1* | 12/2021 | Li | H04W 52/265 |
| 2022/0030575 | A1* | 1/2022 | Farag | H04L 5/0048 |

OTHER PUBLICATIONS

Intel Corporation: "Further Considerations on Sidelink Unicast/Groupcast/Broadcast for NR V2X Communication", 3GPP Draft, R1-1812492, 3GPP TSG RAN WG1 Meeting #95, Intel-EV2X_SL_UGB, 3rd Generation Partnership Project (3GPP), Mobile Competence Centre, 650, Route Des Lucioles, F-06921 Sophia-Antipolis Cedex, France, vol. RAN WG1. No. Spokane, USA, Nov. 12, 2018-Nov. 16, 2018, Nov. 11, 2018 (Nov. 11, 2018), XP051554436, pp. 1-7, Retrieved from the Internet: URL:http://www.3gpp.org/ftp/Meetings%5F3GPP%5FSYNC/RAN1/Docs/R1%2D1812492%2Ezip, [retrieved on Nov. 11, 2018] the whole document.
International Search Report and Written Opinion—PCT/US2021/071098—ISA/EPO—dated Nov. 17, 2021.
LG Electronics: "Discussion on Resource Allocation Mechanism for NR V2X", 3GPP Draft, R1-1901933, 3GPP TSG RAN WG1 #96, Discussion on Resource Allocation Mechanism for NR V2X_LG, 3rd Generation Partnership Project (3GPP), Mobile Competence Centre, 650, Route Des Lucioles, F-06921 Sophia-Antipol, vol. RAN WG1. No. Athens, Greece, Feb. 25, 2019-Mar. 1, 2019, Feb. 16, 2019 (Feb. 16, 2019), XP051599627, pp. 1-12, Retrieved from the Internet: URL:http://www.3gpp.org/ftp/tsg%5Fran/WG1%5FRL1/TSGR1%5F96/Docs/R1%2D1901933%2Ezip, [retrieved on Feb. 16, 2019] Abstract Sections 2.2, 2.4 and 2.5.
LG Electronics: "Summary of Email Discussion on Rel-17 Sidelink Enhancement", 3GPP TSG RAN #86, 3GPP Draft, RP-192745, 3rd Generation Partnership Project (3GPP), Mobile Competence Centre, 650, Route Des Lucioles, F-06921 Sophia-Antipolis Cedex, France, vol. TSG RAN, No. Sitges, ES, Dec. 9, 2012-Dec. 12, 2019, Dec. 2, 2019 (Dec. 2, 2019), 27 Pages, XP051834348, Retrieved from the Internet: URL: https://ftp.3gpp.org/tsg_ran/TSG_RAN/TSGR_86/Docs/RP-192745.zip, RP-192745 Email discussion on sidelink enhancement.doc [retrieved on Dec. 2, 2019], abstract p. 11-14, the whole document.
LG Electronics: "WID Revision: NR Sidelink Enhancement", 3GPP Draft, RP-201385, 3GPP TSG RAN Meeting #88e, 3rd Generation Partnership Project (3GPP), Mobile Competence Centre, 650, Route Des Lucioles, F-06921 Sophia-Antipolis Cedex, France, vol. TSG RAN. No, Electronic Meeting, Jun. 29, 2020-Jul. 3, 2020, Jul. 3, 2020 (Jul. 3, 2020), XP051906760, 6 Pages, Retrieved from the Internet: URL:https://ftp.3gpp.org/tsg_ran/TSG_RAN/TSGR_88e/Docs/RP-201385.zip, RP-201385- rm.doc [retrieved on Jul. 3, 2020] the Whole Document.
Qualcomm Incorporated: "Reliability and Latency Enhancements for Mode 2", 3GPP Draft, R1-2006829, 3GPP TSG RAN WG1 Meeting #102-e, 3rd Generation Partnership Project (3GPP), Mobile Competence Centre, 650, Route Des Lucioles, F-06921 Sophia-Antipolis Cedex, France, vol. RAN WG1. No. Aug. 17, 2020-Aug. 28, 2020, Aug. 8, 2020 (Aug. 8, 2020), XP051918279, 10 Pages, Retrieved from the Internet: URL:https://ftp.3gpp.org/tsg_ran/WG1_RL1/TSGR1_102-e/Docs/R1-2006829.zip, R1- 2006829_mode2_enhancements.docx [retrieved-on Aug. 8, 2020], section 3, p. 3-p. 5, section 4, p. 5-p. 6, the Whole Document.
Qualcomm Incorporated: "Reliability and Latency Enhancements for Mode 2", 3GPP Draft, R1-2009273, 3GPP TSG RAN WG1 Meeting #103-e, 3rd Generation Partnership Project (3GPP), Mobile Competence Centre, 650, Route Des Lucioles, F-06921 Sophia-Antipolis Cedex, France, vol. RAN WG1. No. e-meeting, Oct. 26, 2020-Nov. 13, 2020, Oct. 24, 2020 (Oct. 24, 2020), XP051946936, 19 Pages, Retrieved from the Internet: URL:https://ftp.3gpp.org/tsg_ran/WG1_RL1/TSGR1_103-e/Docs/R1-2009273.zip, R1-2009273_mode2_enhancements.docx [retrieved-on Oct. 24, 2020] the whole document.
Qualcomm Incorporated: "Reliability and Latency Enhancements for Mode 2", 3GPP Draft, R1-2101486, 3GPP TSG RAN WG1 Meeting #104-e , 3rd Generation Partnership Project (3GPP), Mobile Competence Centre, 650, Route Des Lucioles, F-06921 Sophia-Antipolis Cedex, France, vol. Ran WG1. No. Jan. 25, 2021-Feb. 5, 2021, Jan. 19, 2021 (Jan. 19, 2021), XP051971651, 23 Pages, Retrieved from the Internet: URL:https://ftp.3gpp.org/tsg_ran/WG1_RL1/TSGR1_104-e/Docs/R1-2101486.zip R1-2101486 Mode2 Enhancements.docx [retrieved-on Jan. 19, 2021] the whole document.
Qualcomm Incorporated: "Reliability and Latency Enhancements for Mode 2", 3GPP Draft, R1-2101910, 3GPP TSG RAN WG1 Meeting #104-e, 3rd Generation Partnership Project (3GPP), Mobile Competence Centre, 650, Route Des Lucioles, F-06921 Sophia-Antipolis Cedex, France, vol. Ran WG1. No. Jan. 25, 2021-Feb. 5, 2021, Jan. 29, 2021 (Jan. 29, 2021), XP051975989, 23 Pages, Retrieved from the Internet: URL:https://ftp.3gpp.org/tsg_ran/WG1_RL1/TSGR1_104-e/Docs/R1-2101910.zip R1- 2101910_mode2 enhancements.docx [retrieved-on Jan. 29, 2021] the Whole Document.

* cited by examiner

SIDELINK RESOURCE INFORMATION SIGNALING FOR SIDELINK RESOURCE SELECTION

CROSS-REFERENCE TO RELATED APPLICATION

This Patent Application claims priority to U.S. Provisional Patent Application No. 62/706,303, filed on Aug. 7, 2020, entitled "SIDELINK RESOURCE INFORMATION SIGNALING FOR SIDELINK RESOURCE SELECTION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for sidelink resource information signaling for sidelink resource selection.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a first user equipment (UE) includes: receiving, via a sidelink interface, a message from a second UE; and transmitting, to the second UE, sidelink resource information for sidelink resources that are available to the second UE, wherein the sidelink resource information is based at least in part on a measured power level associated with the message received from the second UE.

In some aspects, a method of wireless communication performed by a first UE includes: transmitting, via a sidelink interface, a message to a second UE; receiving, from the second UE, sidelink resource information for sidelink resources that are available to the first UE, wherein the sidelink resource information is based at least in part on a measured power level associated with the message received at the second UE; and transmitting, to the second UE, an inter-UE coordination signal on a sidelink resource selected based at least in part on the sidelink resource information.

In some aspects, a first UE for wireless communication includes: a memory and one or more processors, coupled to the memory, configured to: receive, via a sidelink interface, a message from a second UE; and transmit, to the second UE, sidelink resource information for sidelink resources that are available to the second UE, wherein the sidelink resource information is based at least in part on a measured power level associated with the message received from the second UE.

In some aspects, a first UE for wireless communication includes: a memory and one or more processors, coupled to the memory, configured to: transmit, via a sidelink interface, a message to a second UE; receive, from the second UE, sidelink resource information for sidelink resources that are available to the first UE, wherein the sidelink resource information is based at least in part on a measured power level associated with the message received at the second UE; and transmit, to the second UE, an inter-UE coordination signal on a sidelink resource selected based at least in part on the sidelink resource information.

In some aspects, a non-transitory computer-readable medium storing a set of instructions for wireless communication includes: one or more instructions that, when executed by one or more processors of a first UE, cause the first UE to: receive, via a sidelink interface, a message from a second UE; and transmit, to the second UE, sidelink resource information for sidelink resources that are available to the second UE, wherein the sidelink resource information is based at least in part on a measured power level associated with the message received from the second UE.

In some aspects, a non-transitory computer-readable medium storing a set of instructions for wireless communication includes: one or more instructions that, when executed by one or more processors of a first UE, cause the first UE to: transmit, via a sidelink interface, a message to a second UE; receive, from the second UE, sidelink resource information for sidelink resources that are available to the first UE, wherein the sidelink resource information is based at least in part on a measured power level associated with the message received at the second UE; and transmit, to the second UE, an inter-UE coordination signal on a sidelink resource selected based at least in part on the sidelink resource information.

In some aspects, a first apparatus for wireless communication includes: means for receiving, via a sidelink interface, a message from a second apparatus; and means for transmitting, to the second apparatus, sidelink resource information for sidelink resources that are available to the second apparatus, wherein the sidelink resource information is based at least in part on a measured power level associated with the message received from the second apparatus.

In some aspects, a first apparatus for wireless communication includes: means for transmitting, via a sidelink interface, a message to a second apparatus; means for receiving, from the second apparatus, sidelink resource information for sidelink resources that are available to the first apparatus, wherein the sidelink resource information is based at least in part on a measured power level associated with the message received at the second apparatus; and means for transmitting, to the second apparatus, a coordination signal on a sidelink resource selected based at least in part on the sidelink resource information.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
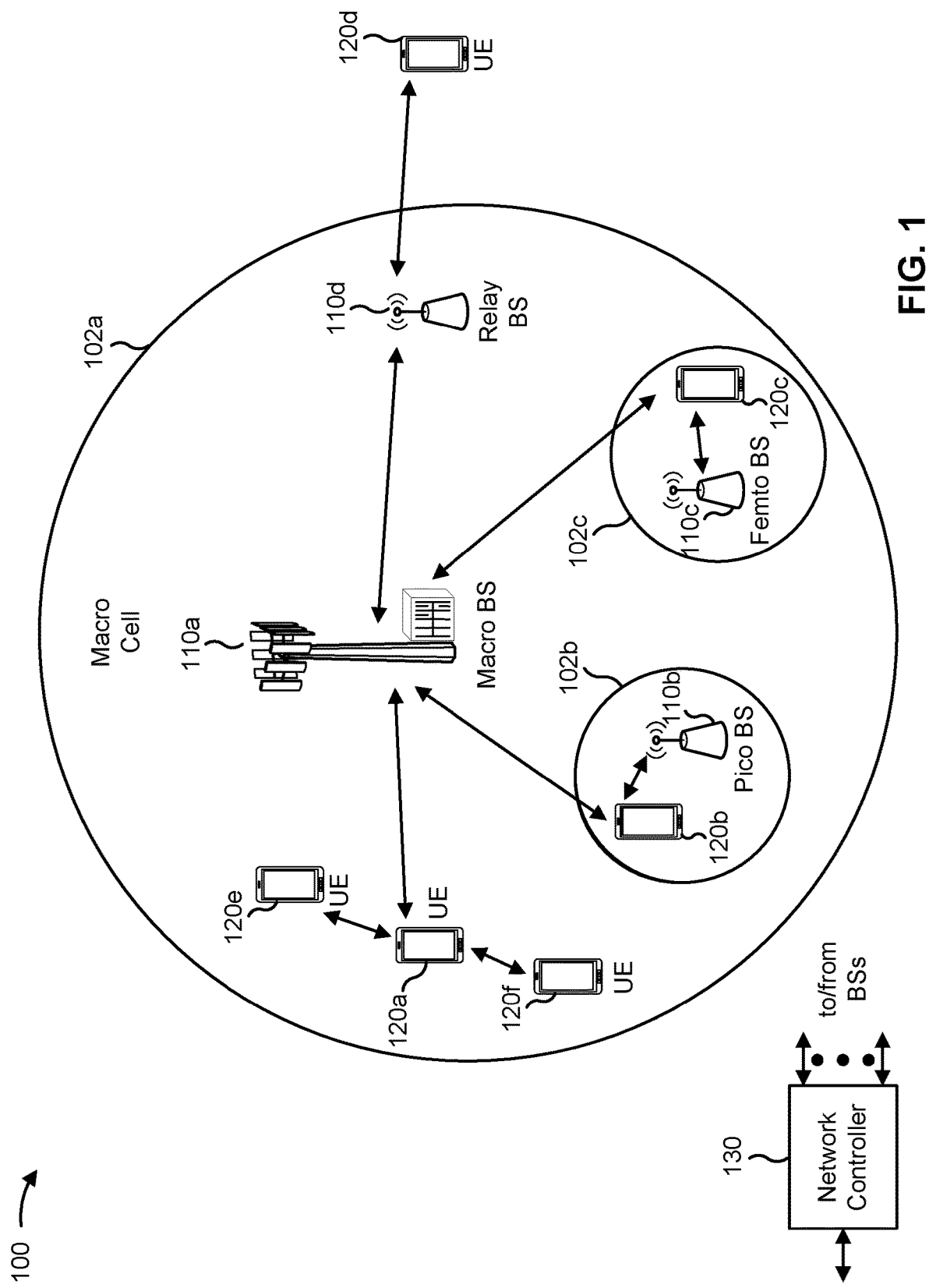
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

As indicated above, FIG. 1 is provided as an example. Other examples may differ from what is described with regard to FIG. 1.

Figure 2:
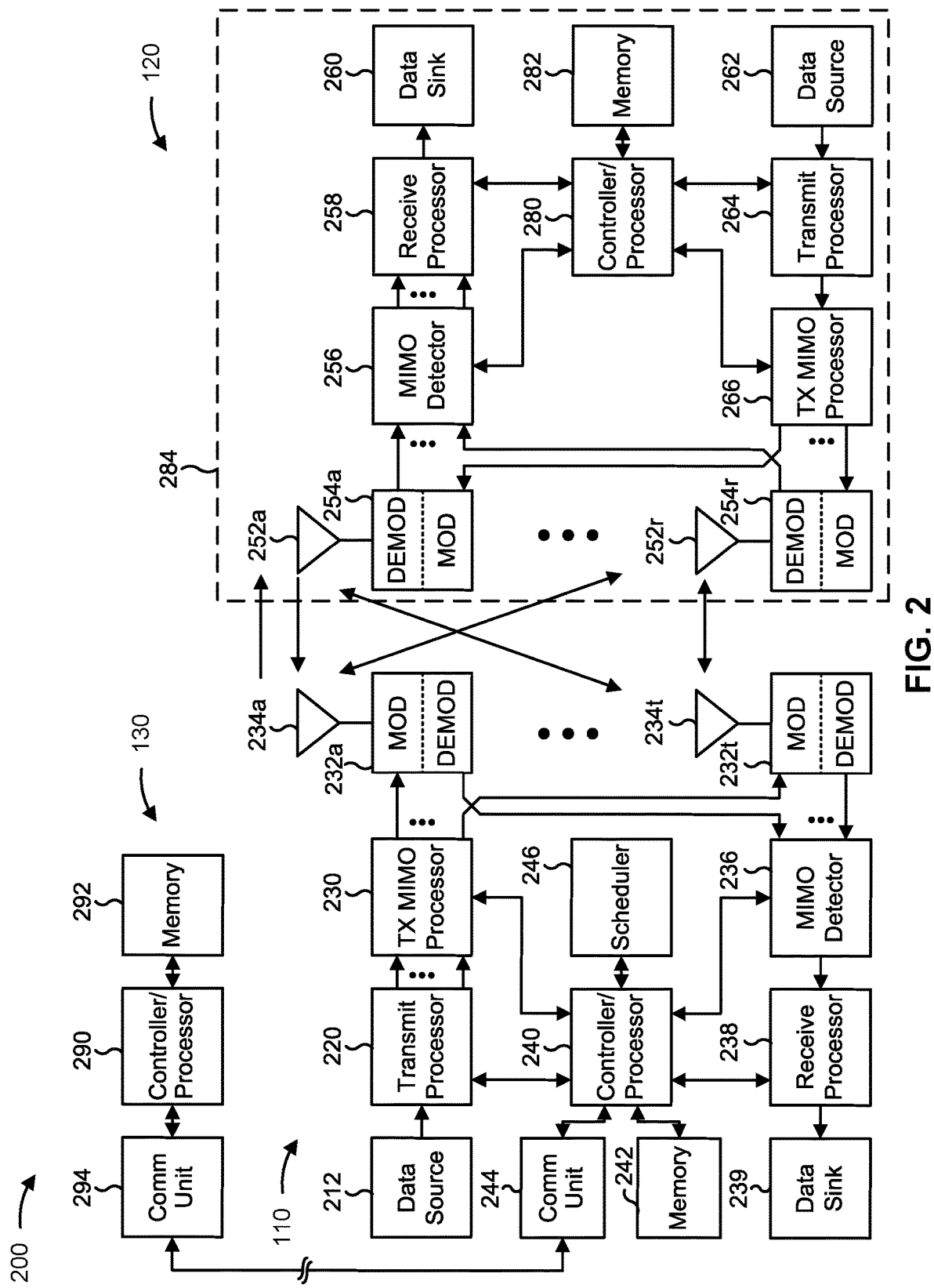
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 8-10).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 8-10).

The controller/processor 240 of the base station 110, the controller/processor 280 of the UE 120, and/or any other component(s) of FIG. 2 may perform one or more techniques associated with sidelink resource information signaling for sidelink resource selection, as described in more detail elsewhere herein. For example, the controller/processor 240 of the base station 110, the controller/processor 280 of the UE 120, and/or any other component(s) of FIG. 2 may perform or direct operations of, for example, process 900 of FIG. 9, process 1000 of FIG. 10, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, process 1000 of FIG. 10, and/or other processes as described herein. In some aspects, executing instructions may include running the instructions, converting the instructions, compiling the instructions, and/or interpreting the instructions.

In some aspects, a first UE (e.g., UE 120) may include means for receiving, via a sidelink interface, a message from a second UE, and/or means for transmitting, to the second UE, sidelink resource information for sidelink resources that are available to the second UE, wherein the sidelink resource information is based at least in part on a measured power level associated with the message received from the second UE. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, and/or receive processor 258.

In some aspects, a first UE (e.g., UE 120) may include means for transmitting, via a sidelink interface, a message to a second UE, means for receiving, from the second UE, sidelink resource information for sidelink resources that are available to the first UE, wherein the sidelink resource information is based at least in part on a measured power level associated with the message received at the second UE, and/or means for transmitting, to the second UE, an inter-UE coordination signal on a sidelink resource selected based at least in part on the sidelink resource information. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, and/or receive processor 258.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
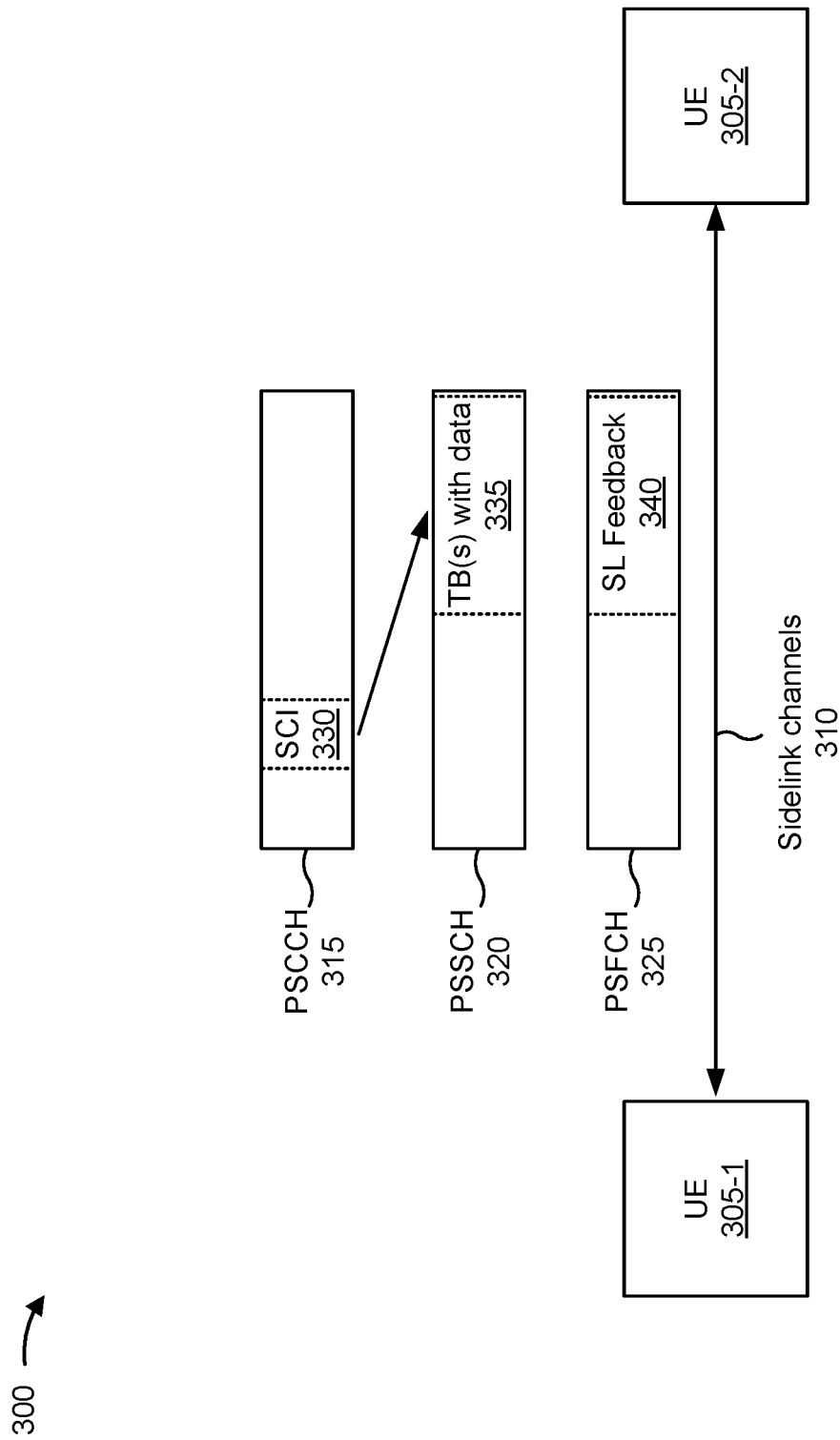
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or V2P communications), and/or mesh networking. In some aspects, the UEs 305 (e.g., UE 305-1 and/or UE 305-2) may be similar to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, and/or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), and/or a scheduling request (SR).

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, and/or may measure an RSRQ parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources, and/or channel parameters. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or an MCS to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
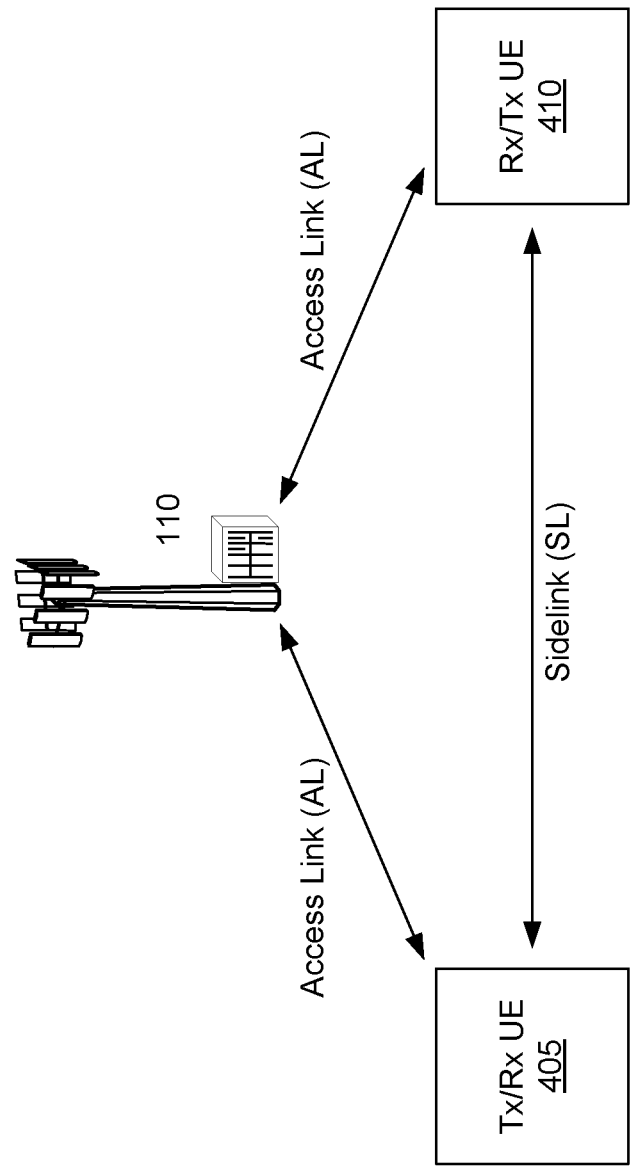
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may be similar to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

Figure 5:
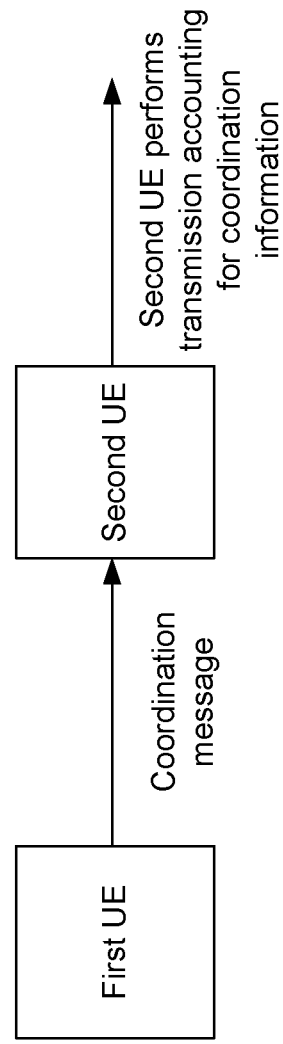
FIG. 5 is a diagram illustrating an example of coordination signaling, in accordance with the present disclosure.

FIG. 5 is a diagram illustrating an example 500 of coordination signaling, in accordance with the present disclosure.

In example 500, a first UE (e.g., UE 120a) exchanges inter-UE coordination signaling with a second UE (e.g., UE 120e). The first UE and the second UE may operate in an in-coverage mode, a partial coverage mode, and/or an out-of-coverage mode. For example, the first UE may determine a set of sidelink resources available for a resource allocation. The first UE may determine the set of sidelink resources based at least in part on determining that the set of sidelink resources are to be selected, or based at least in part on a request, referred to herein as an inter-UE coordination request, received from the second UE or a base station. In some aspects, the first UE may determine the set of sidelink resources based at least in part on a sensing operation, which may be performed before receiving an inter-UE coordination request or after receiving the inter-UE coordination request. The first UE may transmit information indicating the set of available resources to the second UE via inter-UE coordination signaling (shown as a coordination message, and referred to in some aspects as an inter-UE coordination message). The first UE may transmit the information indicating the set of available resources using an NR sidelink resource allocation mode 2. In the NR sidelink resource allocation mode 2, resource allocation is handled by UEs (e.g., in comparison to an NR sidelink resource allocation mode 1, in which resource allocation is handled by a scheduling entity such as a base station). The second UE may select a sidelink resource for a transmission from the second UE based at least in part on the set of available resources received from the first UE. As shown, the second UE may perform the transmission accounting for the coordination information (e.g., via a sidelink resource indicated by the inter-UE coordination message). Inter-UE coordination signaling related to resource allocation may reduce collisions between the first UE and the second UE. Inter-UE coordination signaling related to resource allocation may reduce a power consumption for the first UE and/or the second UE.

As indicated above, FIG. 5 is provided as an example. Other examples may differ from what is described with respect to FIG. 5.

Figure 6:
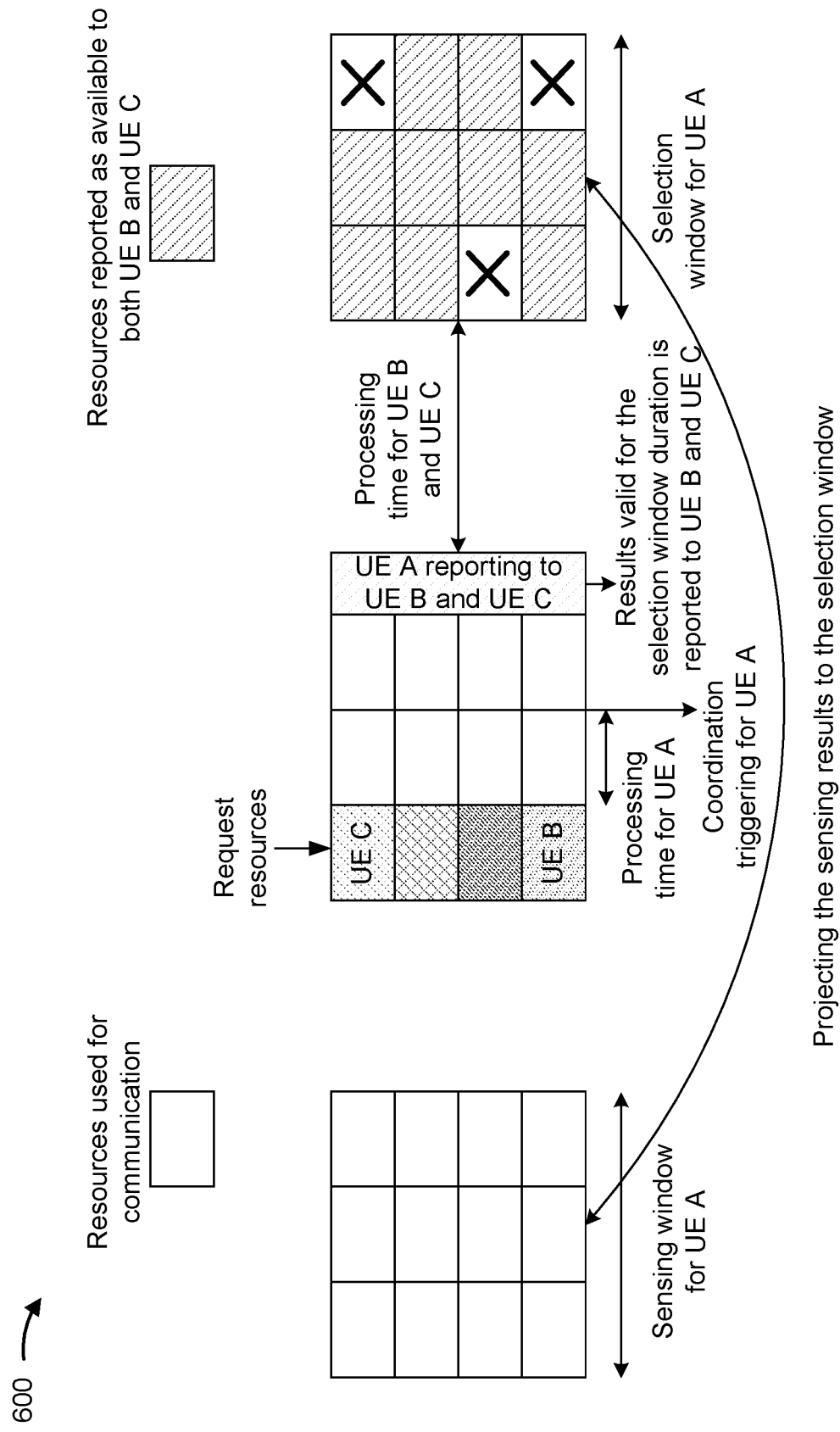
FIG. 6 is a diagram illustrating an example of inter-UE coordination signaling, in accordance with the present disclosure.

FIG. 6 is a diagram illustrating an example 600 of inter-UE coordination signaling, in accordance with the present disclosure.

As shown in FIG. 6, a first UE (UE A) may sense sidelink resources available for sidelink communications during a sensing window. The first UE may receive multiple requests for receiving an inter-UE coordination signal. For example, a second UE (UE B) and a third UE (UE C) may each transmit a separate request to the first UE. The request may be a request for sidelink resources for an inter-UE coordination signal to be received from the first UE. The second UE and the third UE may transmit the requests in sub-channels that overlap in a time domain, but may be separated in a frequency domain. The first UE may receive the requests from the second UE and the third UE, and after a processing time, the first UE may be triggered to determine available sidelink resources based at least in part on the requests received from the second UE and the third UE.

The first UE may determine the available sidelink resources and report the available resources to the second UE and the third UE. The available sidelink resources reported by the first UE may be valid for a duration of a selection window for the first UE. In other words, the first UE may determine the available sidelink resources, from the perspective of the first UE, and the first UE may report the available sidelink resources to the second UE and the third UE. The second UE and the third UE may receive the reporting of available sidelink resources from the first UE, and after a processing time, the second UE and the third UE may determine which sidelink resources are available for sidelink communications. The first UE may report certain sidelink resources as being available to both the second UE and the third UE. The available sidelink resources reported by the first UE may be used by the second UE and/or the third UE for receiving inter-UE coordination signals from the first UE.

As indicated above, FIG. 6 is provided as an example. Other examples may differ from what is described with respect to FIG. 6.

Figure 7:
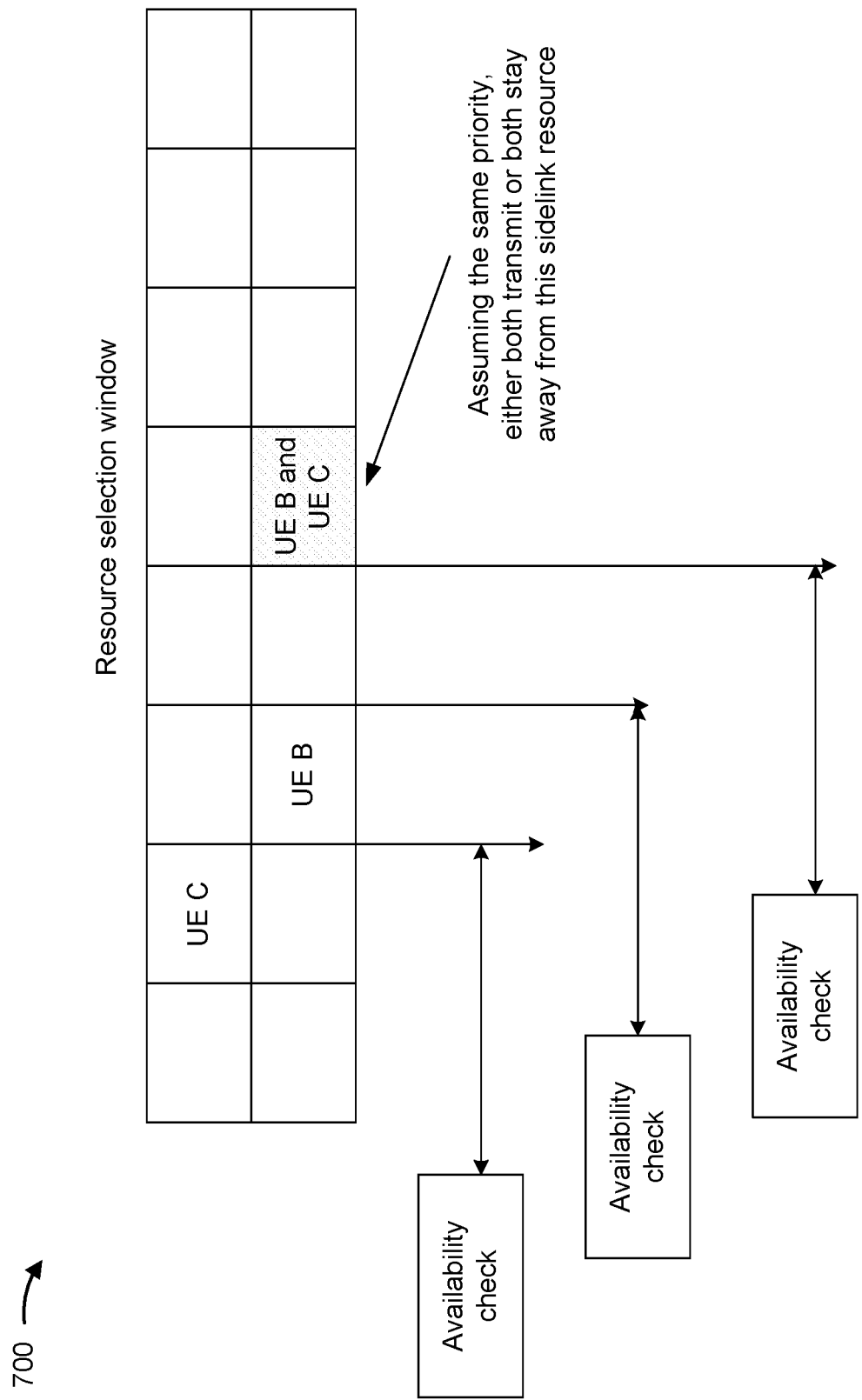
FIG. 7 is a diagram illustrating an example of a resource collision for inter-UE coordination signaling, in accordance with the present disclosure.

FIG. 7 is a diagram illustrating an example 700 of a resource collision for inter-UE coordination signaling, in accordance with the present disclosure.

A first UE may receive requests for available sidelink resources from a second UE (UE B) and a third UE (UE C). The requests received from the second UE and the third UE may be for a given priority of sidelink resources. The first UE may report the available sidelink resources to the second UE and the third UE based at least in part on the requests received from the second UE and the third UE. In some cases, when there is no request from the second UE and the third UE, a base station may request the first UE to report an inter-UE coordination message to both of the second UE and the third UE at a same time. In the case of periodic reporting, a report to both the second UE and the third UE may occur at a same time.

As shown in FIG. 7, the second UE and the third UE may perform inter-UE coordination signaling with the first UE using the available sidelink resources reported by the first UE. For example, the second UE may transmit an inter-UE coordination signal on a first sidelink resource, as reported by the first UE, after performing an availability check on the first sidelink resource. The third UE may transmit an inter-UE coordination signal on a second sidelink resource, as reported by the first UE, after performing an availability check on the second sidelink resource. The first sidelink resource and the second sidelink resource may be selected by the second UE and the third UE, respectively, during a resource selection window.

In some cases, the first UE may be an Rx UE for both the second UE and the third UE. The second UE and the third UE may be wearable devices. The first UE may transmit a report on the available sidelink resources to the second UE and the third UE. The second UE and the third UE may use the report on the available sidelink resources to perform inter-UE coordination signaling with the first UE. In other cases, the first UE may not be an Rx UE for either the second UE or the third UE. The first UE may be a dedicated node that transmits the report on the available sidelink resources to the second UE and the third UE. The second UE may use the report on the available sidelink resources to perform inter-UE coordination signaling with the third UE, and vice versa.

The first UE may report a same set of available sidelink resources to the second UE and the third UE. In some cases, the second UE and the third UE may attempt to perform inter-UE coordination signaling on a same sidelink resource, thereby causing a collision on that same sidelink resource. In other words, the second UE and the third UE may both select a same sidelink resource from the same set of available sidelink resources. In other cases, the second UE and the third UE may avoid a same sidelink resource. In other words, the second UE and the third UE may both avoid the same sidelink resource and may use the information to select resources for their own transmissions. When both the second UE and the third UE avoid a certain available sidelink resource, that sidelink resource may go unused and resource efficiency may be degraded. Additionally, a sidelink resource selection may be triggered at the second UE and/or the third UE, which may involve additional signaling and usage of sidelink resources.

As indicated above, FIG. 7 is provided as an example. Other examples may differ from what is described with respect to FIG. 7.

A first UE may receive a sidelink resource request from a second UE and a third UE. For example, the second UE may transmit the sidelink resource request to the first UE in a same requesting occasion (e.g., in sub-channels that overlap in a time domain, but may be separated in a frequency domain) as compared to the third UE that transmits a separate sidelink resource request to the first UE. The first UE may report a same set of available sidelink resources to the second UE and the third UE. The second UE and the third UE may both use the same set of available sidelink resources, as reported by the first UE, for transmissions of the second UE and the third UE. As a result, the second UE and the third UE may both attempt to transmit an inter-UE coordination signal in a same sidelink resource, thereby causing a collision in the same sidelink resource. Alternatively, the second UE and the third UE may both avoid a same sidelink resource for inter-UE coordination signaling, thereby reducing a sidelink resource usage efficiency.

In various aspects of techniques and apparatuses described herein, a first UE may receive requests from a second UE and a third UE for available sidelink resources during a same requesting occasion. In some aspects, the first UE may measure power levels associated with the requests received from the second UE and the third UE. The first UE may transmit sidelink resource information to the second UE and the third UE. The sidelink resource information may be based at least in part on the measured power levels of the requests received from the second UE and the third UE. Alternatively, the sidelink resource information may be based at least in part on measured power levels of other transmissions received at the first UE from the second UE and the third UE, where the other transmissions may not be requests received from the second UE and the third UE. The sidelink resource information may be for sidelink resources that are available to the second UE and the third UE. The sidelink resource information may include interference information, rank of transmission, and/or MCS information about the sidelink resources that are available to the second UE and the third UE. The sidelink resource information may enable the second UE and the third UE to select available sidelink resources for data transmissions while minimizing a risk of collisions, and/or sidelink resource inefficiency.

In some aspects, the first UE may send inter-UE coordination messages to multiple UEs, such as the second UE and the third UE. The first UE may derive power levels based at least in part on previous messages that the first UE received from the multiple UEs, where the previous messages may be based at least in part on the inter-UE coordination messages. Sidelink resource information may be based at least in part on the power levels associated with the previous messages. For example, the power levels may be derived based at least in part on transmissions from the second UE to the first UE and from the third UE to the first UE.

Figure 8:
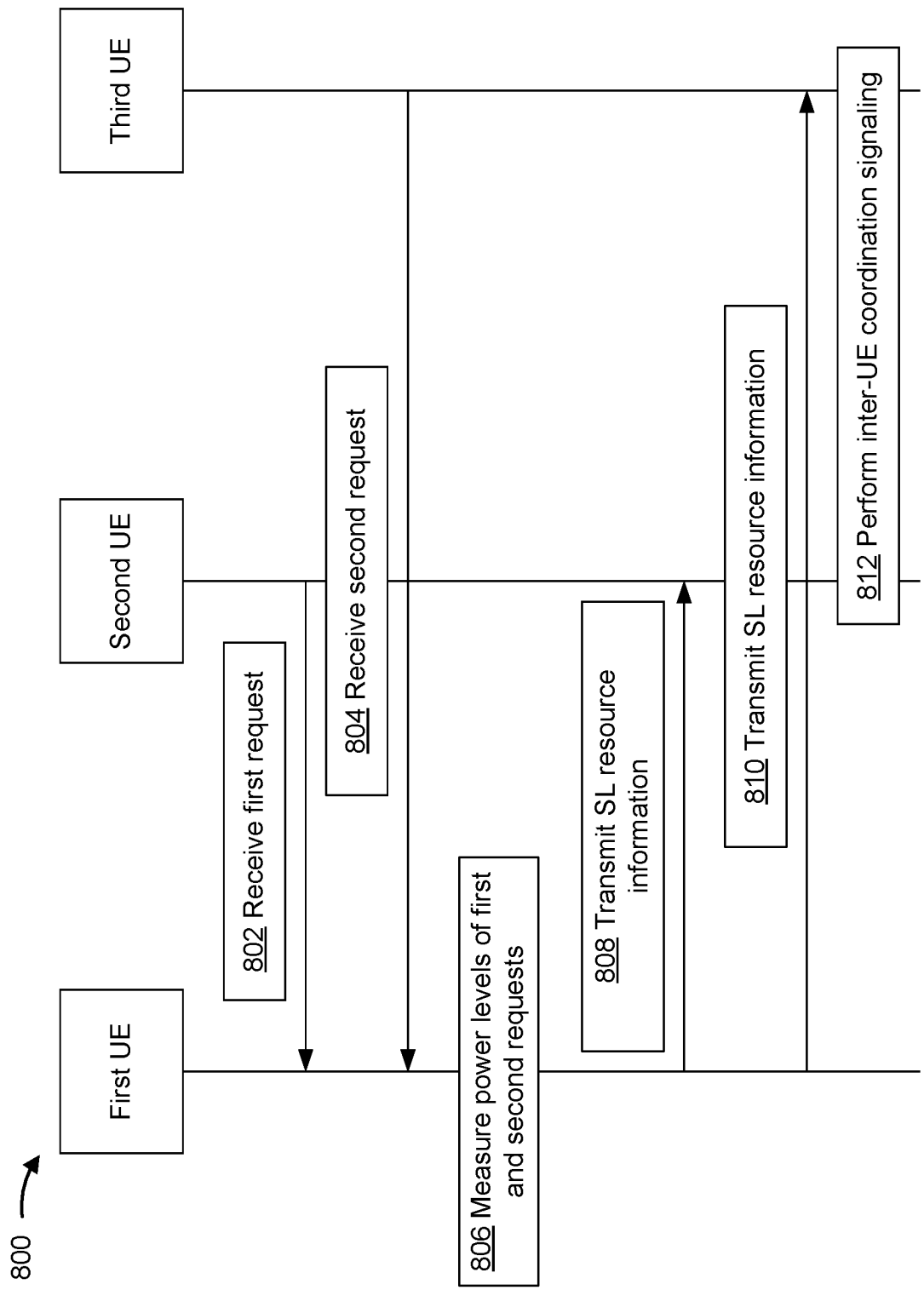
FIG. 8 is a diagram illustrating an example associated with sidelink resource information signaling for sidelink resource selection, in accordance with the present disclosure.

FIG. 8 is a diagram illustrating an example 800 associated with sidelink resource information signaling for sidelink resource selection, in accordance with the present disclosure. As shown in FIG. 8, example 800 includes communication between a first UE (e.g., UE 120a), a second UE (e.g., UE 120e), and a third UE (e.g., UE 120f). In some aspects, the first UE, the second UE, and the third UE may be included in a wireless network such as wireless network 100. The first UE, the second UE, and the third UE may communicate on a wireless sidelink.

As shown by reference number 802, the first UE may receive a first request from the second UE. The first request may be associated with sidelink resources for inter-UE coordination signaling from the first UE. For example, the second UE may request information on available sidelink resources from the first UE. The available sidelink resources may be used to perform inter-UE coordination signaling between the first UE and the second UE.

As shown by reference number 804, the first UE may receive a second request from the third UE. The second request may be associated with sidelink resources for inter-UE coordination signaling from the first UE. For example, the third UE may request information on available sidelink resources from the first UE. The available sidelink resources may be used to perform inter-UE coordination signaling between the first UE and the third UE.

In some aspects, the first UE may receive the first request from the second UE during a same requesting occasion as the second request received from the third UE. For example, the first request and the second request may be received in sub-channels that overlap in a time domain, but may be separated in a frequency domain. In another example, the first request and the second request may be received in sub-channels that are separated in a time domain and a frequency domain, but are within the same requesting occasion which may span a defined number of slots in the time domain.

In some aspects, the first UE may receive requests from more than two UEs on the same requesting occasion. For example, the first UE may receive requests from three or more UEs on the same requesting occasion.

As shown by reference number 806, the first UE may measure a power level associated with the first request received from the second UE. The first UE may measure the power level associated with the first request by determining an RSRP, an RSRQ, and/or an RSSI associated with the first request. Additionally, the first UE may measure a power level associated with the second request received from the third UE. The first UE may measure the power level associated with the second request by determining an RSRP, an RSRQ, and/or an RSSI associated with the second request.

As shown by reference number 808, the first UE may transmit, to the second UE, sidelink resource information for sidelink resources that are available to the second UE. The sidelink resource information may be based at least in part on the measured power level associated with the first request received from the second UE, and the measured power level associated with the second request received from the third UE.

In some aspects, the sidelink resource information may include an expected interference level for the second UE on the sidelink resources due to the third UE. The expected interference level may be based at least in part on the measured power level associated with the first request received from the second UE and the measured power level associated with the second request received from the third UE.

In some aspects, the first UE may measure a power level (e.g., an RSRP) of the first request received from the second UE and a power level (e.g., an RSRP) of the second request received from the third UE. The power level of the second UE may act as interference power at the third UE, and the power level of the third UE may act as interference power at the second UE. Interference power levels or equivalent signal-to-interference-plus-noise ratio (SINR) values may be reported by the first UE to the second UE. For example, the first UE may report to the second UE an expected interference power level on available sidelink resources, where the expected interference power level at the second UE may be due to the third UE.

In some aspects, the sidelink resource information may include a maximum MCS for the second UE. The maximum MCS for the second UE may be a maximum tolerable MCS, and may be based at least in part on the measured power level associated with the first request received from the second UE and the measured power level associated with the second request received from the third UE. The maximum MCS may be applicable to at least a portion of a plurality of sidelink resources in a selection window associated with the first UE.

In some aspects, the first UE may measure the power level (e.g., an RSRP) of the first request received from the second UE and the power level (e.g., an RSRP) of the second request received from the third UE. The first UE may determine the maximum MCS (e.g., the maximum tolerable MCS) for the second UE based at least in part on the power levels associated with the first request and the second request, respectively. The first UE may transmit a report that includes an indication of the maximum MCS to the second UE. The report may include a defined number of bits (e.g., 5 bits) to define the maximum MCS for the second UE. The maximum MCS may be applicable for transmissions from the second UE during a selection window of the first UE. The maximum MCS that is applicable to the transmissions from the second UE may be due to the third UE. The maximum MCS may be a single value that is applicable to a plurality of sidelink resources (e.g., all sidelink resources) in the selection window of the first UE for each of the requesting UEs, such as the second UE.

In some aspects, the first UE may receive an MCS table indicator from the second UE. The first UE may determine the maximum MCS for the second UE based at least in part on the MCS table indicator received from the second UE.

In some aspects, the first UE may determine an MCS table to use based at least in part on a higher layer pre-configuration and the MCS table indicator received from the second UE. The MCS table indicator may be received from the second UE in SCI format 1-A. The MCS table indicator may be a 1-bit or 2-bit indicator that indicates a particular MCS table to be used by the first UE. The MCS table may be preconfigured at the first UE, and/or the MCS table may be provided by a higher layer parameter, such as a sidelink additional MCS table (sl-Additional-MCS-Table) higher layer parameter. The first UE may receive the MCS table indicator from the second UE, and the MCS table indicator may enable the first UE to determine and transmit the maximum MCS to the second UE.

In some aspects, the first UE may determine the MCS table indicator in a number of manners, where the maximum MCS may be determined based at least in part on the MCS table indicator. For example, the first UE may receive the MCS table indicator from the second UE. In other words, the MCS table indicator may be received from a UE that transmits a request. As another example, the first UE may select the MCS table indicator without receiving the MCS table indicator from the second UE. As another example, the first UE may select the MCS table indicator based at least in part on a configuration received from a base station. For example, the MCS table indicator may be fixed by a pre-configuration. As yet another example, the first UE may select the MCS table indicator based at least in part on a priority level of inter-UE coordination signaling from the first UE. In other words, the MCS table indicator may be dependent on the priority level for which the inter-UE coordination signaling is to be generated.

In some aspects, the MCS table indicator may enable the first UE to generate an inter-UE coordination signal for transmission to the second UE. For example, the first UE may determine the MCS table indicator based at least in part on signaling received from the second UE, signaling received from the base station, a pre-configuration at the first UE, and/or the priority level for which the inter-UE coordination signaling is to be generated. The first UE may perform inter-UE coordination signaling with the second UE using a selected sidelink resource based at least in part on the MCS table indicator.

As shown by reference number 810, the first UE may transmit, to the third UE, sidelink resource information for sidelink resources that are available to the third UE. The sidelink resource information may be based at least in part on the measured power level associated with the first request received from the second UE, and the measured power level associated with the second request received from the third UE.

In some aspects, the sidelink resource information may include an expected interference level for the third UE on the sidelink resources due to the second UE. The expected interference level may be based at least in part on the measured power level associated with the first request received from the second UE and the measured power level associated with the second request received from the third UE.

In some aspects, the first UE may determine interference power levels or equivalent SINR values based at least in part on the measured power levels associated with the first and second requests. The first UE may report the interference power levels to the third UE. For example, the first UE may report to the third UE an expected interference power level at the third UE on one or more available sidelink resources, where the expected interference power level at the third UE may be due to the second UE.

In some aspects, the sidelink resource information may include a maximum MCS for the third UE. The maximum MCS for the third UE may be a maximum tolerable MCS, and may be based at least in part on the measured power level associated with the first request received from the second UE and the measured power level associated with the second request received from the third UE. The maximum MCS may be applicable to a plurality of sidelink resources in a selection window associated with the first UE.

In some aspects, the first UE may determine the maximum MCS (e.g., the maximum tolerable MCS) for the third UE based at least in part on the power levels associated with the first request and the second request, respectively. The first UE may transmit a report that includes an indication of the maximum MCS to the third UE. The maximum MCS may be applicable for transmissions from the third UE during a selection window of the first UE. The maximum MCS that is applicable to the transmissions from the third UE may be due to the second UE.

In some aspects, the first UE may receive an MCS table indicator from the third UE. The first UE may determine the maximum MCS for the third UE based at least in part on the MCS table indicator received from the third UE.

In some aspects, the first UE may determine an MCS table to use based at least in part on a higher layer pre-configuration and the MCS table indicator received from the third UE. The MCS table indicator may be received from the third UE in SCI format 1-A. The first UE may receive the MCS table indicator from the third UE, and the MCS table indicator may enable the first UE to determine and transmit the maximum MCS to the third UE.

In some aspects, the MCS table indicator may enable the first UE to generate an inter-UE coordination signal for transmission to the third UE. For example, the first UE may determine the MCS table indicator based at least in part on signaling received from the third UE, signaling received from the base station, a pre-configuration at the first UE, and/or the priority level for which the inter-UE coordination signaling is to be generated. The first UE may perform inter-UE coordination signaling with the third UE using a selected sidelink resource based at least in part on the MCS table indicator.

As shown by reference number 812, the second UE may receive the sidelink resource information from the first UE, where the sidelink resource information may include the expected interference power level and/or the maximum MCS. The second UE may transmit a communication on a sidelink resource selected based at least in part on the sidelink resource information. In other words, the second UE may select the sidelink resource based at least in part on the expected interference power level and/or the maximum MCS included in the sidelink resource information received from the first UE.

Similarly, the third UE may receive the sidelink resource information from the first UE, where the sidelink resource information may include the expected interference power level and/or the maximum MCS. The third UE may transmit a communication on a sidelink resource selected based at least in part on the sidelink resource information.

In some aspects, the second UE and/or the third UE may transmit a communication on an available sidelink resource based at least in part on the maximum MCS. For example, the second UE and/or the third UE may sense and reserve an available sidelink resource, and the second UE and/or the third UE may apply the maximum MCS for a first transmission on a first reserved sidelink resource included in the sidelink resources.

In some aspects, the second UE and/or the third UE may transmit a communication on an available sidelink resource based at least in part on a disregard of the maximum MCS when no collision is detected by the first UE on the reserved sidelink resource. For example, for transmission occasions other than the first transmission on the first reserved sidelink resource, the second UE and/or the third UE may disregard the maximum MCS when no collision is detected from another UE in a same group of UEs (e.g., a group of UEs that transmit requests to the first UE during a same requesting occasion, such as the second UE and the third UE). The second UE and/or the third UE may detect the collision from another UE in the same group of UEs based at least in part on source identifiers (IDs) of UEs included in the same group of UEs, where the source IDs may be received from the first UE.

In some aspects, the second UE and/or the third UE may transmit a communication on an available sidelink resource based at least in part on the maximum MCS when a collision is detected by the first UE on the reserved sidelink resource. For example, for transmission occasions other than the first transmission on the first reserved sidelink resource, the second UE and/or the third UE may apply the maximum MCS on a given sidelink resource when a collision is identified from another UE in the same group of UEs.

In some aspects, the second UE and/or the third UE may detect SCI from other UEs in the same group of UEs. When the second UE and/or the third UE is unable to detect the SCI from other UEs in the same group of UEs, the second UE and/or the third UE may apply the maximum MCS when latency reduction is desirable. Alternatively, the second UE and/or the third UE may disregard the maximum MCS, which may increase a likelihood of failure, but may improve a throughput.

In some aspects, the first UE may transmit information indicating a disjoint set of sidelink resources to the second UE and/or the third UE. The disjoint set of sidelink resources may indicate the sidelink resources that are available to the second UE and/or the third UE. The first UE may report the disjoint set of sidelink resources when the second UE and/or the third UE are unable to sense available sidelink resources themselves.

In some aspects, the first UE may transmit the information indicating the disjoint set of sidelink resources with additional information to the second UE and/or the third UE. The additional information may include the maximum MCS, and/or the expected interference power level.

In some aspects, the first UE may transmit to the second UE and/or the third UE an indication of a maximum number of supported layers at the first UE. The first UE may instruct the second UE and/or the third UE to transmit using a defined number of layers that is based at least in part on the maximum number of supported layers at the first UE. For example, the first UE may have two receive antennas, and the first UE may request the second UE and/or the third UE to transmit with a single layer.

In some aspects, the first UE may perform channel estimations for channels between the first UE and the second and third UEs, respectively, since channel state information reference signals (CSI-RSs) may be supported on a sidelink interface. The first UE may use the channel estimation to nullify or reduce interference on sub-channels for which channel state information (CSI) reports are available.

As indicated above, FIG. 8 is provided as an example. Other examples may differ from what is described with respect to FIG. 8.

Figure 9:
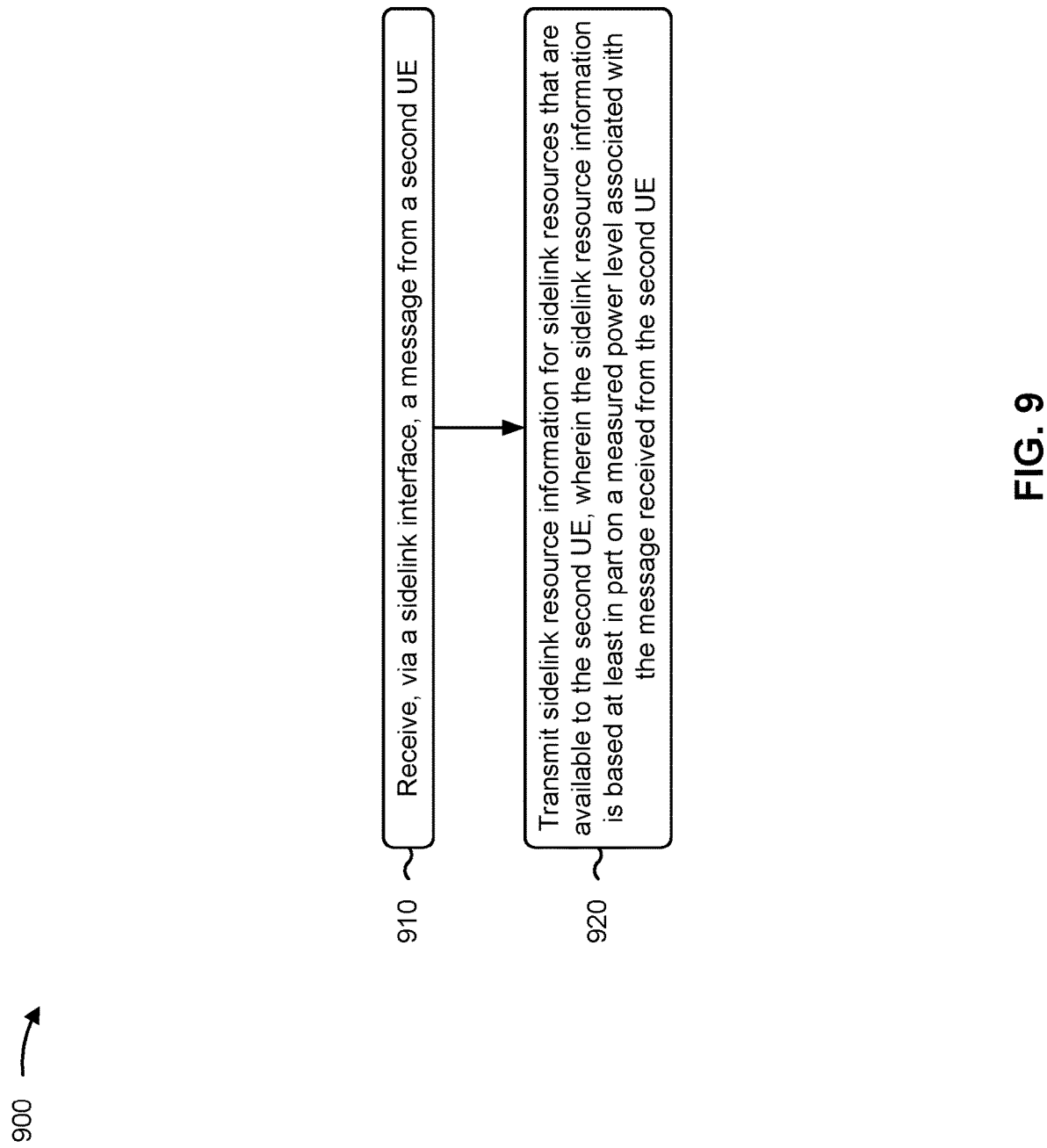
FIGS. 9-10 are diagrams illustrating example processes associated with sidelink resource information signaling for sidelink resource selection, in accordance with the present disclosure.

FIG. 9 is a diagram illustrating an example process 900 performed, for example, by a first UE, in accordance with the present disclosure. Example process 900 is an example where the first UE (e.g., UE 120) performs operations associated with sidelink resource information signaling for sidelink resource selection.

As shown in FIG. 9, in some aspects, process 900 may include receiving, via a sidelink interface, a message from a second UE (block 910). For example, the first UE (e.g., using antenna 252, demodulator 254, MIMO detector 256, receive processor 258, controller/processor 280, and/or memory 282) may receive, via a sidelink interface, a message from a second UE, as described above.

As further shown in FIG. 9, in some aspects, process 900 may include transmitting, to the second UE, sidelink resource information for sidelink resources that are available to the second UE, wherein the sidelink resource information is based at least in part on a measured power level associated with the message received from the second UE (block 920). For example, the first UE (e.g., using antenna 252, transmit processor 264, TX MIMO processor 266, modulator 254, controller/processor 280, and/or memory 282) may transmit, to the second UE, sidelink resource information for sidelink resources that are available to the second UE, wherein the sidelink resource information is based at least in part on a measured power level associated with the message received from the second UE, as described above.

Process 900 may include additional aspects, such as any single aspect or any combination of aspects described below and/or in connection with one or more other processes described elsewhere herein.

In a first aspect, the message is associated with sidelink resources for inter-UE coordination signaling from the first UE.

In a second aspect, alone or in combination with the first aspect, process 900 includes performing an RSRP measurement of the message as the measured power level associated with the message.

In a third aspect, alone or in combination with one or more of the first and second aspects, process 900 includes receiving an additional message from a third UE, and determining the sidelink resource information for sidelink resources that are available to the second UE and the third UE based at least in part on the measured power level associated with the message received from the second UE and a measured power level associated with the additional message received from the third UE.

In a fourth aspect, alone or in combination with one or more of the first through third aspects, the sidelink resource information includes an expected interference level for the second UE on the sidelink resources due to the third UE, and the expected interference level is based at least in part on the measured power level associated with the message received from the second UE and the measured power level associated with an additional message received from a third UE.

In a fifth aspect, alone or in combination with one or more of the first through fourth aspects, the sidelink resource information includes a maximum MCS for the second UE, and the maximum MCS for the second UE is based at least in part on the measured power level associated with the message received from the second UE and the measured power level associated with an additional message received from a third UE.

In a sixth aspect, alone or in combination with one or more of the first through fifth aspects, the maximum MCS is applicable to a plurality of sidelink resources in a selection window associated with the first UE.

In a seventh aspect, alone or in combination with one or more of the first through sixth aspects, process 900 includes receiving an MCS table indicator from the second UE, and determining the maximum MCS for the second UE based at least in part on the MCS table indicator received from the second UE.

In an eighth aspect, alone or in combination with one or more of the first through seventh aspects, process 900 includes selecting an MCS table indicator, and determining the maximum MCS for the second UE based at least in part on the MCS table indicator.

In a ninth aspect, alone or in combination with one or more of the first through eighth aspects, process 900 includes selecting an MCS table indicator based at least in part on a configuration received from a base station, and determining the maximum MCS for the second UE based at least in part on the MCS table indicator.

In a tenth aspect, alone or in combination with one or more of the first through ninth aspects, process 900 includes selecting an MCS table indicator based at least in part on a priority level of inter-UE coordination signaling from the first UE, and determining the maximum MCS for the second UE based at least in part on the MCS table indicator.

In an eleventh aspect, alone or in combination with one or more of the first through tenth aspects, process 900 includes determining an MCS table indicator, and performing inter-UE coordination signaling with the second UE using a selected sidelink resource based at least in part on the MCS table indicator.

In a twelfth aspect, alone or in combination with one or more of the first through eleventh aspects, the maximum MCS is applicable to at least a portion of sidelink resources in a selection window associated with the first UE.

In a thirteenth aspect, alone or in combination with one or more of the first through twelfth aspects, process 900 includes transmitting a set of sidelink resources to the second UE, and the set of sidelink resources indicate the sidelink resources that are available to the second UE.

In a fourteenth aspect, alone or in combination with one or more of the first through thirteenth aspects, process 900 includes transmitting, to the second UE, an indication of a maximum number of supported layers at the first UE, and instructing the second UE to transmit using a defined number of layers that is based at least in part on the maximum number of supported layers at the first UE.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
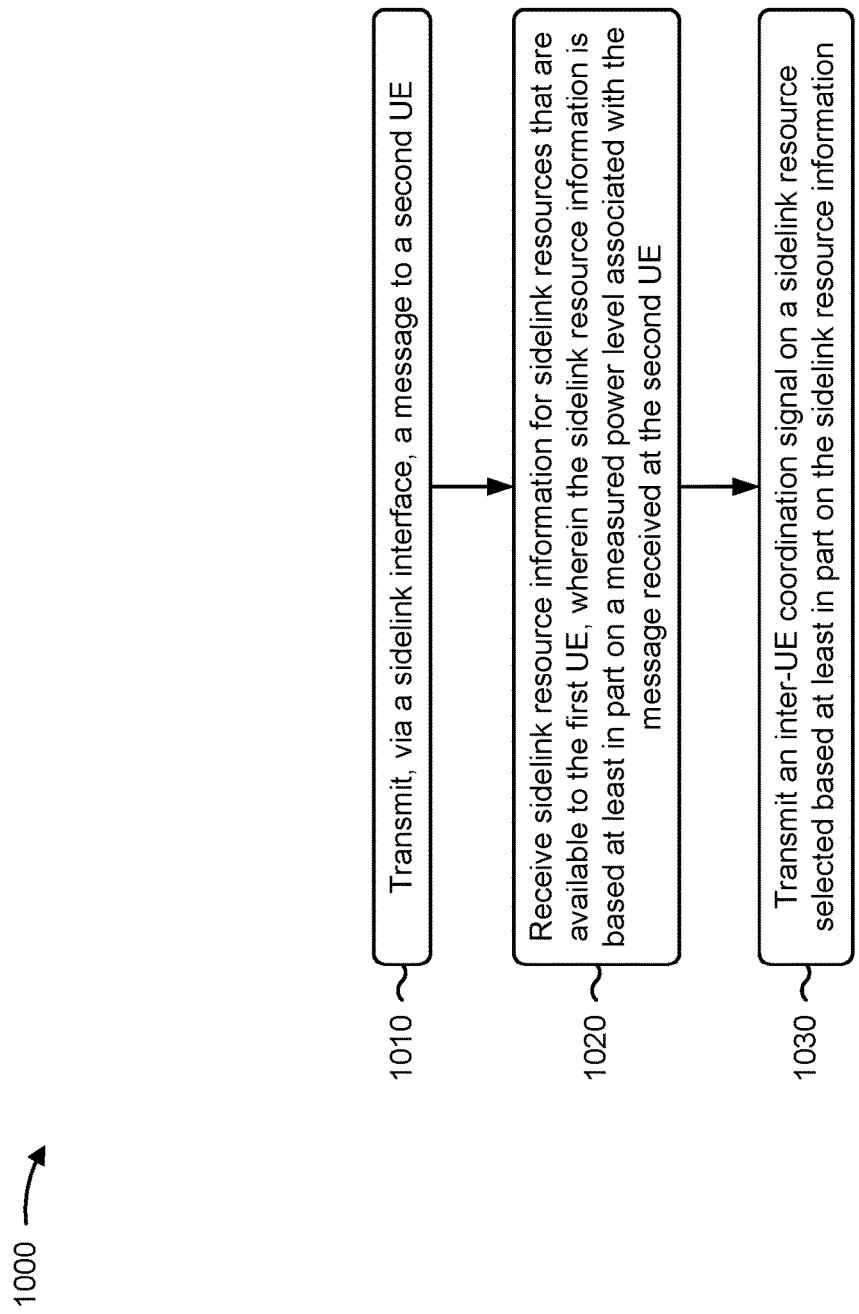

FIG. 10 is a diagram illustrating an example process 1000 performed, for example, by a first UE, in accordance with the present disclosure. Example process 1000 is an example where the first UE (e.g., UE 120) performs operations associated with sidelink resource information signaling for sidelink resource selection.

As shown in FIG. 10, in some aspects, process 1000 may include transmitting, via a sidelink interface, a message to a second UE (block 1010). For example, the first UE (e.g., using antenna 252, transmit processor 264, TX MIMO processor 266, modulator 254, controller/processor 280, and/or memory 282) may transmit, via a sidelink interface, a message to a second UE, as described above.

As further shown in FIG. 10, in some aspects, process 1000 may include receiving, from the second UE, sidelink resource information for sidelink resources that are available to the first UE, wherein the sidelink resource information is based at least in part on a measured power level associated with the message received at the second UE (block 1020). For example, the first UE (e.g., using antenna 252, demodulator 254, MIMO detector 256, receive processor 258, controller/processor 280, and/or memory 282) may receive, from the second UE, sidelink resource information for sidelink resources that are available to the first UE, wherein the sidelink resource information is based at least in part on a measured power level associated with the message received at the second UE, as described above.

As further shown in FIG. 10, in some aspects, process 1000 may include transmitting, to the second UE, an inter-UE coordination signal on a sidelink resource selected based at least in part on the sidelink resource information (block 1030). For example, the first UE (e.g., using antenna 252, transmit processor 264, TX MIMO processor 266, modulator 254, controller/processor 280, and/or memory 282) may transmit, to the second UE, an inter-UE coordination signal on a sidelink resource selected based at least in part on the sidelink resource information, as described above. In some aspects, the first UE may transmit a communication other than an inter-UE coordination signal. In some aspects, the first UE may transmit the communication to a device other than the second UE.

Process 1000 may include additional aspects, such as any single aspect or any combination of aspects described below and/or in connection with one or more other processes described elsewhere herein.

In a first aspect, the message is associated with sidelink resources for the inter-UE coordination signaling with the second UE.

In a second aspect, alone or in combination with the first aspect, the measured power level associated with the message is an RSRP measurement of the message.

In a third aspect, alone or in combination with one or more of the first and second aspects, the sidelink resource information includes an expected interference level for the first UE on the sidelink resources due to the third UE, and the expected interference level is based at least in part on the measured power level associated with the message received at the second UE and a measured power level associated with an additional message received at a second UE.

In a fourth aspect, alone or in combination with one or more of the first through third aspects, the sidelink resource information includes a maximum MCS for the first UE, and the maximum MCS for the first UE is based at least in part on the measured power level associated with the message received at the second UE and a measured power level associated with an additional message received at the second UE.

In a fifth aspect, alone or in combination with one or more of the first through fourth aspects, the maximum MCS is applicable to a plurality of sidelink resources in a selection window associated with the second UE.

In a sixth aspect, alone or in combination with one or more of the first through fifth aspects, process 1000 includes transmitting an MCS table indicator to the second UE, and the maximum MCS for the first UE is based at least in part on the MCS table indicator.

In a seventh aspect, alone or in combination with one or more of the first through sixth aspects, process 1000 includes transmitting an MCS table indicator to the second UE, and performing inter-UE coordination signaling with the second UE using a selected sidelink resource based at least in part on the MCS table indicator.

In an eighth aspect, alone or in combination with one or more of the first through seventh aspects, the maximum MCS is applicable to at least a portion of sidelink resources in a selection window associated with the second UE.

In a ninth aspect, alone or in combination with one or more of the first through eighth aspects, process 1000 includes performing a transmission on a reserved sidelink resource of the sidelink resources that are available to the first UE based at least in part on the maximum MCS.

In a tenth aspect, alone or in combination with one or more of the first through ninth aspects, process 1000 includes performing a transmission on a reserved sidelink resource of the sidelink resources that are available to the first UE based at least in part on a disregard of the maximum MCS when no collision is detected by the first UE on the reserved sidelink resource.

In an eleventh aspect, alone or in combination with one or more of the first through tenth aspects, process 1000 includes performing a transmission on a reserved sidelink resource of the sidelink resources that are available to the first UE based at least in part on the maximum MCS when a collision is detected by the first UE on the reserved sidelink resource.

In a twelfth aspect, alone or in combination with one or more of the first through eleventh aspects, process 1000 includes receiving a set of sidelink resources from the second UE, and the set of sidelink resources indicate the sidelink resources that are available to the first UE.

In a thirteenth aspect, alone or in combination with one or more of the first through twelfth aspects, process 1000 includes receiving, from the second UE, an indication of a maximum number of supported layers at the second UE, and receiving a message from the second UE to transmit using a defined number of layers that is based at least in part on the maximum number of supported layers at the second UE.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

The following provides an overview of some Aspects of the present disclosure:

Aspect 1: A method of wireless communication performed by a first user equipment (UE), comprising: receiving, via a sidelink interface, a message from a second UE; and transmitting, to the second UE, sidelink resource information for sidelink resources that are available to the second UE, wherein the sidelink resource information is based at least in part on a measured power level associated with the message received from the second UE.

Aspect 2: The method of Aspect 1, wherein the message is associated with sidelink resources for inter-UE coordination signaling from the first UE.

Aspect 3: The method of any of Aspects 1 through 2, further comprising: performing a reference signal received power (RSRP) measurement of the message as the measured power level associated with the message.

Aspect 4: The method of any of Aspects 1 through 3, further comprising: receiving an additional message from a third UE; and determining the sidelink resource information for sidelink resources that are available to the second UE and the third UE based at least in part on the measured power level associated with the message received from the second UE and a measured power level associated with the additional message received from the third UE.

Aspect 5: The method of Aspect 4, wherein the sidelink resource information includes an expected interference level for the second UE on the sidelink resources due to the third UE, and wherein the expected interference level is based at least in part on the measured power level associated with the message received from the second UE and the measured power level associated with an additional message received from the third UE.

Aspect 6: The method of Aspect 4, wherein the sidelink resource information includes a maximum modulation and coding scheme (MCS) for the second UE.

Aspect 7: The method of Aspect 6, wherein the maximum MCS is applicable to a plurality of sidelink resources in a selection window associated with the first UE.

Aspect 8: The method of Aspect 6, further comprising: receiving an MCS table indicator from the second UE; and determining the maximum MCS for the second UE based at least in part on the MCS table indicator received from the second UE.

Aspect 9: The method of Aspect 6, further comprising: selecting an MCS table indicator; and determining the maximum MCS for the second UE based at least in part on the MCS table indicator.

Aspect 10: The method of Aspect 6, further comprising: selecting an MCS table indicator based at least in part on a configuration received from a base station; and determining the maximum MCS for the second UE based at least in part on the MCS table indicator.

Aspect 11: The method of Aspect 6, further comprising: selecting an MCS table indicator based at least in part on a priority level of inter-UE coordination signaling from the first UE; and determining the maximum MCS for the second UE based at least in part on the MCS table indicator.

Aspect 12: The method of Aspect 6, further comprising: determining an MCS table indicator; and performing inter-UE coordination signaling with the second UE using a selected sidelink resource based at least in part on the MCS table indicator.

Aspect 13: The method of Aspect 6, wherein the maximum MCS is applicable to at least a portion of sidelink resources in a selection window associated with the first UE.

Aspect 14: The method of any of Aspects 1 through 13, further comprising: transmitting a set of sidelink resources to the second UE, wherein the set of sidelink resources indicate the sidelink resources that are available to the second UE.

Aspect 15: The method of any of Aspects 1 through 14, further comprising: transmitting, to the second UE, an indication of a maximum number of supported layers at the first UE; and instructing the second UE to transmit using a defined number of layers that is based at least in part on the maximum number of supported layers at the first UE.

Aspect 16: A method of wireless communication performed by a first user equipment (UE), comprising: transmitting, via a sidelink interface, a message to a second UE; receiving, from the second UE, sidelink resource information for sidelink resources that are available to the first UE, wherein the sidelink resource information is based at least in part on a measured power level associated with the message received at the second UE; and transmitting, to the second UE, an inter-UE coordination signal on a sidelink resource selected based at least in part on the sidelink resource information.

Aspect 17: The method of Aspect 16, wherein the message is associated with sidelink resources for the inter-UE coordination signaling with the second UE.

Aspect 18: The method of any of Aspects 16 through 17, wherein the measured power level associated with the message is a reference signal received power (RSRP) measurement of the message.

Aspect 19: The method of any of Aspects 16 through 18, wherein the sidelink resource information includes an expected interference level for the first UE on the sidelink resources due to a third UE, and wherein the expected interference level is based at least in part on the measured power level associated with the message received at the second UE and a measured power level associated with an additional message received at the second UE.

Aspect 20: The method of any of Aspects 16 through 19, wherein the sidelink resource information includes a maximum modulation and coding scheme (MCS) for the first UE.

Aspect 21: The method of Aspect 20, wherein: the maximum MCS is applicable to a plurality of sidelink resources in a selection window associated with the second UE; or the maximum MCS is applicable to at least a portion of the plurality of sidelink resources in the selection window associated with the second UE.

Aspect 22: The method of Aspect 20, further comprising: transmitting an MCS table indicator to the second UE, wherein the maximum MCS for the first UE is based at least in part on the MCS table indicator.

Aspect 23: The method of Aspect 20, further comprising: transmitting an MCS table indicator to the second UE; and performing inter-UE coordination signaling with the second UE using a selected sidelink resource based at least in part on the MCS table indicator.

Aspect 24: The method of Aspect 20, further comprising: performing a transmission on a reserved sidelink resource of the sidelink resources that are available to the first UE based at least in part on the maximum MCS.

Aspect 25: The method of Aspect 20, further comprising: performing a transmission on a reserved sidelink resource of the sidelink resources that are available to the first UE based at least in part on a disregard of the maximum MCS when no collision is detected by the first UE on the reserved sidelink resource.

Aspect 26: The method of Aspect 20, further comprising: performing a transmission on a reserved sidelink resource of the sidelink resources that are available to the first UE based at least in part on the maximum MCS when a collision is detected by the first UE on the reserved sidelink resource.

Aspect 27: The method of any of Aspects 16 through 26, further comprising: receiving a set of sidelink resources from the second UE, wherein the set of sidelink resources indicate the sidelink resources that are available to the first UE.

Aspect 28: The method of any of Aspects 16 through 27, further comprising: receiving, from the second UE, an indication of a maximum number of supported layers at the second UE; and receiving a message from the second UE to transmit using a defined number of layers that is based at least in part on the maximum number of supported layers at the second UE.

Aspect 29: An apparatus for wireless communication at a device, comprising a processor; memory coupled with the processor; and instructions stored in the memory and executable by the processor to cause the apparatus to perform the method of one or more of Aspects 1-15.

Aspect 30: A device for wireless communication, comprising a memory and one or more processors coupled to the memory, the one or more processors configured to perform the method of one or more of Aspects 1-15.

Aspect 31: An apparatus for wireless communication, comprising at least one means for performing the method of one or more of Aspects 1-15.

Aspect 32: A non-transitory computer-readable medium storing code for wireless communication, the code comprising instructions executable by a processor to perform the method of one or more of Aspects 1-15.

Aspect 33: A non-transitory computer-readable medium storing a set of instructions for wireless communication, the set of instructions comprising one or more instructions that, when executed by one or more processors of a device, cause the device to perform the method of one or more of Aspects 1-15.

Aspect 34: An apparatus for wireless communication at a device, comprising a processor; memory coupled with the processor; and instructions stored in the memory and executable by the processor to cause the apparatus to perform the method of one or more of Aspects 16-28.

Aspect 35: A device for wireless communication, comprising a memory and one or more processors coupled to the memory, the one or more processors configured to perform the method of one or more of Aspects 16-28.

Aspect 36: An apparatus for wireless communication, comprising at least one means for performing the method of one or more of Aspects 16-28.

Aspect 37: A non-transitory computer-readable medium storing code for wireless communication, the code comprising instructions executable by a processor to perform the method of one or more of Aspects 16-28.

Aspect 38: A non-transitory computer-readable medium storing a set of instructions for wireless communication, the set of instructions comprising one or more instructions that, when executed by one or more processors of a device, cause the device to perform the method of one or more of Aspects 16-28.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a first user equipment (UE), comprising:
   transmitting, via a sidelink interface, a message to a second UE;
   receiving, from the second UE, sidelink resource information for sidelink resources that are available to the first UE, wherein the sidelink resource information is based at least in part on a measured power level associated with the message received at the second UE, and wherein the sidelink resource information includes a maximum modulation and coding scheme (MCS) for the first UE;
   transmitting an inter-UE coordination signal on a sidelink resource selected based at least in part on the sidelink resource information; and
   performing a transmission on a reserved sidelink resource of the sidelink resources that are available to the first UE based at least in part on a disregard of the maximum MCS when no collision is detected by the first UE on the reserved sidelink resource, or based at least in part on the maximum MCS when a collision is detected by the first UE on the reserved sidelink resource.

2. The method of claim 1, wherein the message is associated with sidelink resources for the inter-UE coordination signaling with the second UE.

3. The method of claim 1, wherein the measured power level associated with the message is a reference signal received power (RSRP) measurement of the message.

4. The method of claim 1, wherein the sidelink resource information includes an expected interference level for the first UE on the sidelink resources due to a third UE, and wherein the expected interference level is based at least in part on the measured power level associated with the message received at the second UE and a measured power level associated with an additional message received at the second UE.

5. The method of claim 1, wherein:
   the maximum MCS is applicable to a plurality of sidelink resources in a selection window associated with the second UE; or
   the maximum MCS is applicable to at least a portion of the plurality of sidelink resources in the selection window associated with the second UE.

6. The method of claim 1, further comprising:
   transmitting an MCS table indicator to the second UE, wherein the maximum MCS for the first UE is based at least in part on the MCS table indicator.

7. The method of claim 1, further comprising:
transmitting an MCS table indicator to the second UE; and
performing inter-UE coordination signaling with the second UE using a selected sidelink resource based at least in part on the MCS table indicator.

8. The method of claim 1, wherein performing the transmission is based at least in part on the disregard of the maximum MCS when no collision is detected by the first UE on the reserved sidelink resource.

9. The method of claim 1, wherein performing the transmission is based at least in part on the maximum MCS when the collision is detected by the first UE on the reserved sidelink resource.

10. The method of claim 1, further comprising:
receiving a set of sidelink resources from the second UE, wherein the set of sidelink resources indicate the sidelink resources that are available to the first UE.

11. The method of claim 1, further comprising:
receiving, from the second UE, an indication of a maximum number of supported layers at the second UE; and
receiving an additional message from the second UE to transmit using a defined number of layers that is based at least in part on the maximum number of supported layers at the second UE.

12. A first user equipment (UE) for wireless communication, comprising one or more processors, coupled to one or more memories, and configured to cause the first UE to:
transmit, via a sidelink interface, a message to a second UE;
receive, from the second UE, sidelink resource information for sidelink resources that are available to the first UE, wherein the sidelink resource information is based at least in part on a measured power level associated with the message received at the second UE, and wherein the sidelink resource information includes a maximum modulation and coding scheme (MCS) for the first UE;
transmit an inter-UE coordination signal on a sidelink resource selected based at least in part on the sidelink resource information; and
perform a transmission on a reserved sidelink resource of the sidelink resources that are available to the first UE based at least in part on a disregard of the maximum MCS when no collision is detected by the first UE on the reserved sidelink resource, or based at least in part on the maximum MCS when a collision is detected by the first UE on the reserved sidelink resource.

13. The first UE of claim 12, wherein the message is associated with sidelink resources for the inter-UE coordination signaling with the second UE.

14. The first UE of claim 12, wherein the measured power level associated with the message is a reference signal received power (RSRP) measurement of the message.

15. The first UE of claim 12, wherein the sidelink resource information includes an expected interference level for the first UE on the sidelink resources due to a third UE, and wherein the expected interference level is based at least in part on the measured power level associated with the message received at the second UE and a measured power level associated with an additional message received at the second UE.

16. The first UE of claim 12, wherein:
the maximum MCS is applicable to a plurality of sidelink resources in a selection window associated with the second UE; or
the maximum MCS is applicable to at least a portion of the plurality of sidelink resources in the selection window associated with the second UE.

17. The first UE of claim 12, wherein the one or more processors are configured to cause the first UE to:
transmit an MCS table indicator to the second UE, wherein the maximum MCS for the first UE is based at least in part on the MCS table indicator.

18. The first UE of claim 12, wherein the one or more processors are configured to cause the first UE to:
transmit an MCS table indicator to the second UE; and
perform inter-UE coordination signaling with the second UE using a selected sidelink resource based at least in part on the MCS table indicator.

19. The first UE of claim 12, wherein the one or more processors are configured to cause the first UE to perform the transmission based at least in part on the disregard of the maximum MCS when no collision is detected by the first UE on the reserved sidelink resource.

20. The first UE of claim 12, wherein the one or more processors are configured to cause the first UE to perform the transmission based at least in part on the maximum MCS when the collision is detected by the first UE on the reserved sidelink resource.

21. The first UE of claim 12, wherein the one or more processors are configured to cause the first UE to:
receive a set of sidelink resources from the second UE, wherein the set of sidelink resources indicate the sidelink resources that are available to the first UE.

22. The first UE of claim 12, wherein the one or more processors are configured to cause the first UE to:
receive, from the second UE, an indication of a maximum number of supported layers at the second UE; and
receive an additional message from the second UE to transmit using a defined number of layers that is based at least in part on the maximum number of supported layers at the second UE.

* * * * *